(12) United States Patent
Ouitz

(10) Patent No.: US 6,691,878 B1
(45) Date of Patent: Feb. 17, 2004

(54) ARM AND BRACE SYSTEM

(76) Inventor: Ernest G. Ouitz, 619 Cattlemen Rd., Suite #6, Sarasota, FL (US) 34232

( * ) Notice: Subject to any disclaimer, the term of this patent is extended or adjusted under 35 U.S.C. 154(b) by 0 days.

(21) Appl. No.: 10/214,972

(22) Filed: Aug. 8, 2002

(65) Prior Publication Data

(65)

(51) Int. Cl.[7] .................................................. A47F 5/00
(52) U.S. Cl. .................. 211/104; 211/17; 211/103; 211/117; 248/297.11
(58) Field of Search ................................ 211/117, 103, 211/104, 17, 18; 248/297.11

(56) References Cited

U.S. PATENT DOCUMENTS

| | | | | |
|---|---|---|---|---|
| 528,498 A | * | 10/1894 | Anderson | |
| 1,099,345 A | * | 6/1914 | Dougherty | |
| 1,745,713 A | * | 2/1930 | Reed | |
| 2,000,336 A | * | 5/1935 | Kerr | 211/47 |
| 5,224,677 A | * | 7/1993 | Close | 211/104 X |
| 5,292,011 A | * | 3/1994 | Kostigian | 211/48 |
| 5,664,687 A | * | 9/1997 | Liatti | 211/17 |
| 6,302,278 B1 | * | 10/2001 | Dueck | 211/17 |

* cited by examiner

Primary Examiner—Robert W. Gibson, Jr.
(74) Attorney, Agent, or Firm—Dorothy S. Morse

(57) ABSTRACT

A dynamic system for elevating and bracing horizontal load bearing arms carried by one or more vertical members, singularly or in pairs. The arm and brace system of the present invention is adapted to allow a load to be raised to an elevated storage position and then easily and promptly lowered for access as needed. The design is scaleable to accommodate three-dimensional specifications particular to an application, and adaptable to lifting mechanisms of various weight capacities.

21 Claims, 7 Drawing Sheets

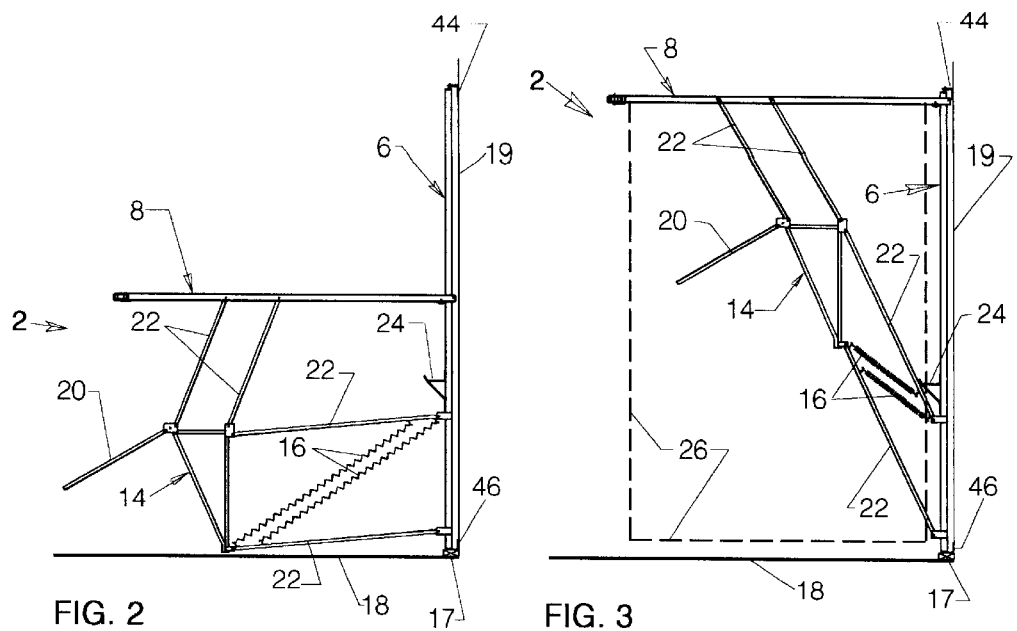
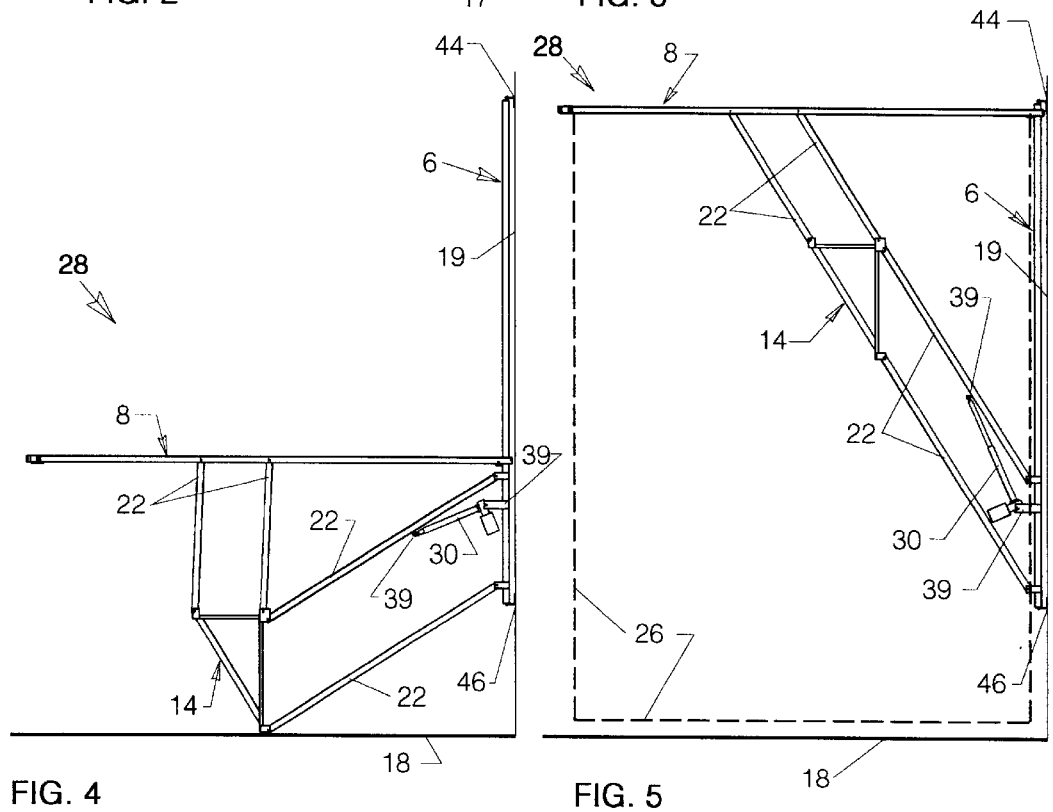

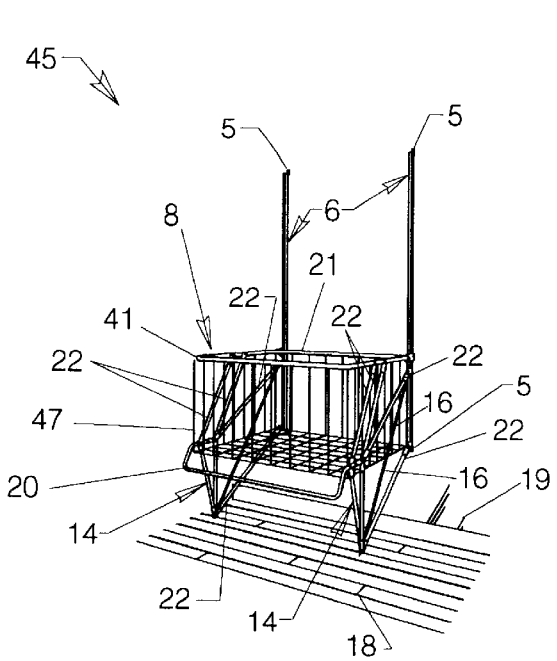
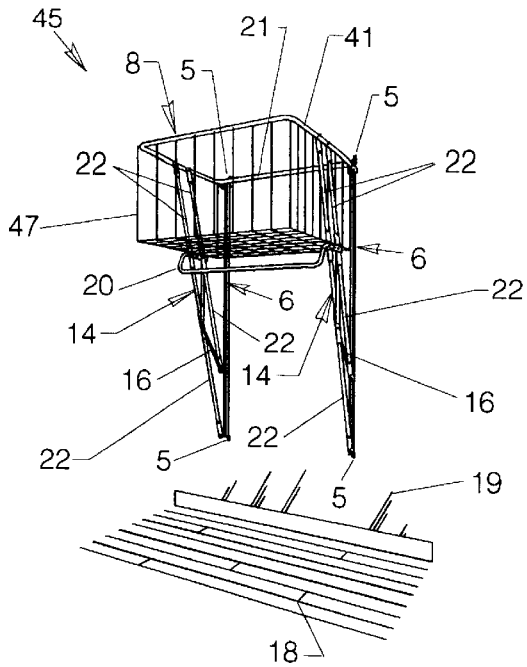
FIG. 11
FIG. 12
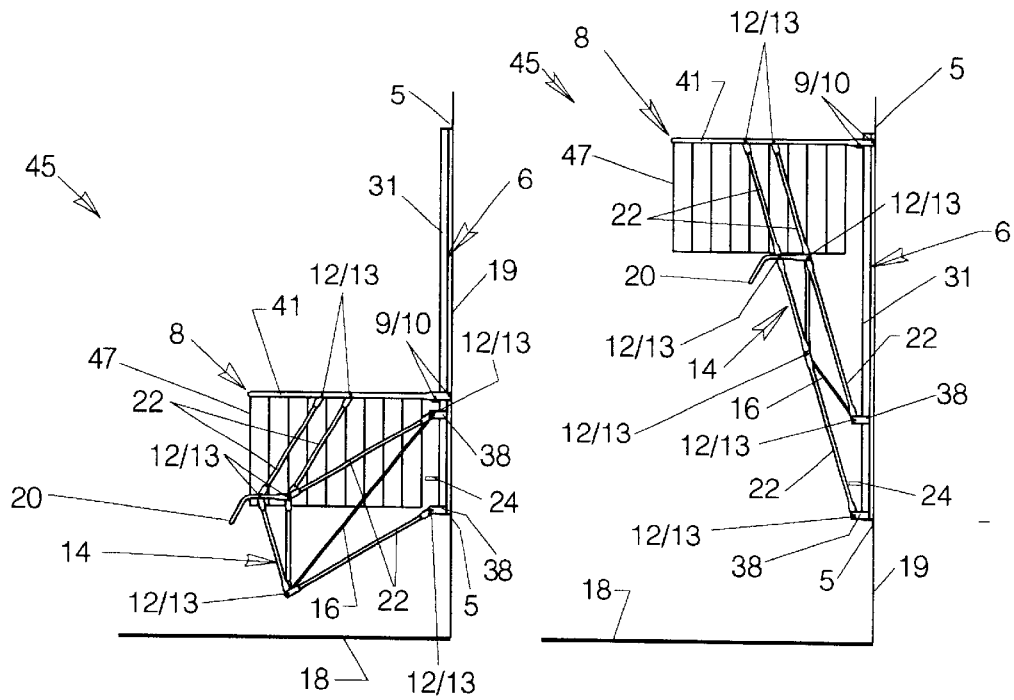
FIG. 13
FIG. 14

ARM AND BRACE SYSTEM

BACKGROUND OF THE INVENTION

1. Field of the Invention

An arm and brace system for use in page style displays, modular storage units, and similar applications, such as, but not limited to, that used for the display, storage, and handling of rugs and carpets.

2. Description of Related Art

The display, handling, and storage of large goods engender special solutions in keeping with the nature of the merchandise to be sold. Products such as rugs, carpets, drapery fabrics and similar goods have inspired the design and manufacture of special equipment in response to the unique display, handling, and storage problems associated therewith. Showing rugs in particular, raises a number of challenging problems. Rugs are offered and desired in a large variety of qualities, colors, patterns, and sizes. To appeal to the general public, large assortments are generally offered. However the merchant must resolve conflicting issues inherent between the efficient utilization of selling space and the requirement for an effective presentation method. The trade-offs often lead to a solution that is a compromise at best.

Buyers insist on seeing the full rug before making a purchase. Efficiency of space will generally dictate that the rugs be stored and displayed in a compact manner. Two methods are common. The first is as old as the market itself. Selling from piles. To meet the buyer's demand to see all of the rug and make comparisons between rugs, laborers must be employed by the merchant to manipulate the rug piles. Selling from rug piles has the advantage of allowing the sales person to talk with the buyer and draw the buyer out as to their real needs and desires. It also has the psychological advantage of requiring the buyer to invest their time and sympathy in the sale; thereby helping to build a commitment towards the purchase. The limitations of this method were and are obvious. This is a labor and time intensive sale, a luxury that only makes sense at the high end of the market.

The second method seeks to address the limitations inherent with selling from rug piles, however this solution created new limitations of its own. Rack systems were developed at the end of the 1800's, such as U.S. Pat. No. 487,110 to Best (1892), which is based upon the concept of page type displays. In the Best invention, rugs hung on pivoting arm and brace assemblies swing back and forth in book fashion and can be viewed quickly and efficiently. The trade off for the merchant and buyer is that the rug must be viewed in an unnatural position, vertically rather than horizontally. In addition, a merchant using the display equipment, has the problem of hanging the rug up, and then getting it back down.

Several attempts have been made to improve upon the swinging rug arm method. All involve schemes that incorporate a feature to raise and lower the rug arm. Various designs were developed in the early 1900's using some form of rope & pulley system to raise and lower a page style rug arm: U.S. Pat. No. 806,705 to O'Neal (1905); U.S. Pat. No. 1,006,345 to Edwards (1911); U.S. Pat. No. 1,099,345 to Dougherty (1914); U.S. Pat. No. 1,162,989 to Doran (1915); U.S. Pat. No. 1,180,480 to Dougherty (1916), U.S. Pat. No. 1,745,713 to Reed (1930); and U.S. Pat. No. 2,000,336 to Kerr (1935). These solutions had limited commercial success due to some obvious mechanical drawbacks, namely poor space efficiency when compared to fixed rug arms and braces, and physically awkward manually operated rope and pulley mechanics.

Two more recent designs involve the use of power driven equipment to raise and lower the arms. One scheme disclosed in U.S. Pat. No. 3,187,900 to Schneider (1965) and U.S. Pat. No. 3,315,813 to Schneider (1967) uses a massive lift to raise and lower a bank of several display arms using a floating platform and arm pivot support. It requires an elevating mechanism for the platform to be built into the display's supporting framework. Because the arms must be raised and lowered in multiples rather than individually, the design is cumbersome with multiple rugs folded and draped on the floor in the lowered position, and more limited in space efficiency than the single arm or unit plan design of the present invention. It is also inherently expensive, requiring a heavy electric motor and lifting apparatus for each bank of arms. More recently, in U.S. Pat. No. 5,292,011 to Kostigian (1994), a Canadian company has revived the rope and pulley concepts from the early 1900's, updating the rope and pulley concept from U.S. Pat. No. 2,000,336 to Kerr (1935) using a wench and cable mechanism, to raise or lower rug arms that display large rugs. The design has had some success in Europe and Canada, but only limited success in the United States due to its expense and poor space efficiency when compared to existing traditional rug arm systems.

BRIEF SUMMARY OF THE INVENTION—OBJECTIVES AND ADVANTAGES

The purpose of this invention is to address the issues summarized above, namely: the raising and lowering of rug display arms in a simple, convenient, easy to operate, space efficient, and cost efficient manner. In addition the solution suggests applications beyond rug display .to include adaptations of the arm and brace system for the many items that can benefit from an elevated display or storage position such as: drapery fabrics, beach towels, large sheet goods of any kind, as well as sporting goods like sleeping bags, and even awkward-to-display merchandise like bicycles. When configured in pairs, the invention allows for raising and lowering of storage baskets, shelving, cabinet boxes, and specialty fixtures, thereby expanding its utility even further.

The raising and lowering mechanism of the present invention is incorporated into each arm and brace assembly using a vertical guide assembly to limit arm movement between a position of lowest elevation and a position of highest elevation. Pivoting parallel bars form the bracing that connects the arm and brace assembly to a parallel guide assembly and then to the base of the vertical guide assembly for additional support. Movement of the pivoting parallel bars raises or lowers the arm and brace assembly between its positions of highest and lowest elevation. For lighter weight applications, spring or elastic tension is used to assist in a manual operation of the arm and brace assembly. For heavier applications, a mechanical lift uses a screw drive to provide a secure means of raising and lowering without risk of sudden or unexpected dropping of the arm and brace assembly. Manual or power assisted drives can be used.

Use of the invention allows one person to store, display, and handle large rugs and similarly awkward merchandise or materials, thereby saving labor. Thus, merchants can reduce the labor needed to hang rugs, in addition to the risk of worker injury from climbing and working on ladders. The present invention also allows rugs or other materials to be easily and promptly lowered for horizontal viewing or access, and then expediently raised back up for display and/or storage. The unique parallel brace design of the present invention achieves the same compactness of design (measured by the separation between arms or pivot hole centers) presently available to fixed rug arm and brace systems, thereby offering the added benefits of raising and lowering its arm and brace assemblies without making a sacrifice as to the number of arms, hence rugs, the merchant is able to store and display in a given space. Furthermore, the arm and brace system of the present invention is based on the unit plan, with additional arm and brace assembly units being added as needed to create displays of desired capacities; utilizing mounting fixtures appropriate for the particular installation, be it the commonly used wall mounting fixture, post mounting fixture, or self-standing mounting fixture. The present invention, embodied in pairs, can be used to raise storage baskets, shelving, cabinet boxes, or specialty fixtures such as a bicycle rack for elevated storage and then quickly and easily lower them for access to the same. With this in mind the invention offers utility for general storage applications, in addition to its rug display and storage capability.

BRIEF DESCRIPTION OF THE SEVERAL VIEWS OF THE DRAWINGS

The present invention will be best understood from reading the following specification, taken in conjunction with the accompanying drawings wherein:

FIG. 2. Side view of the first preferred embodiment with tension springs, in lowered position.

FIG. 3. Side view of the first preferred embodiment with tension springs, in elevated position.

FIG. 4. Side view of a second preferred embodiment of the present invention with mechanical lift, in lowered position.

FIG. 5. Side view of the second preferred embodiment with mechanical lift, in elevated position.

FIG. 11. Perspective view of a fifth preferred embodiment of the present invention configured for basket support, in lowered position.

FIG. 12. Perspective view of the fifth preferred embodiment configured for basket support, in elevated position.

FIG. 13. Side view of the fifth preferred embodiment configured for basket support, in lowered position.

FIG. 14. Side view of the fifth preferred embodiment configured for basket support, in elevated position.

DETAILED DESCRIPTION OF THE INVENTION

Figure 1:
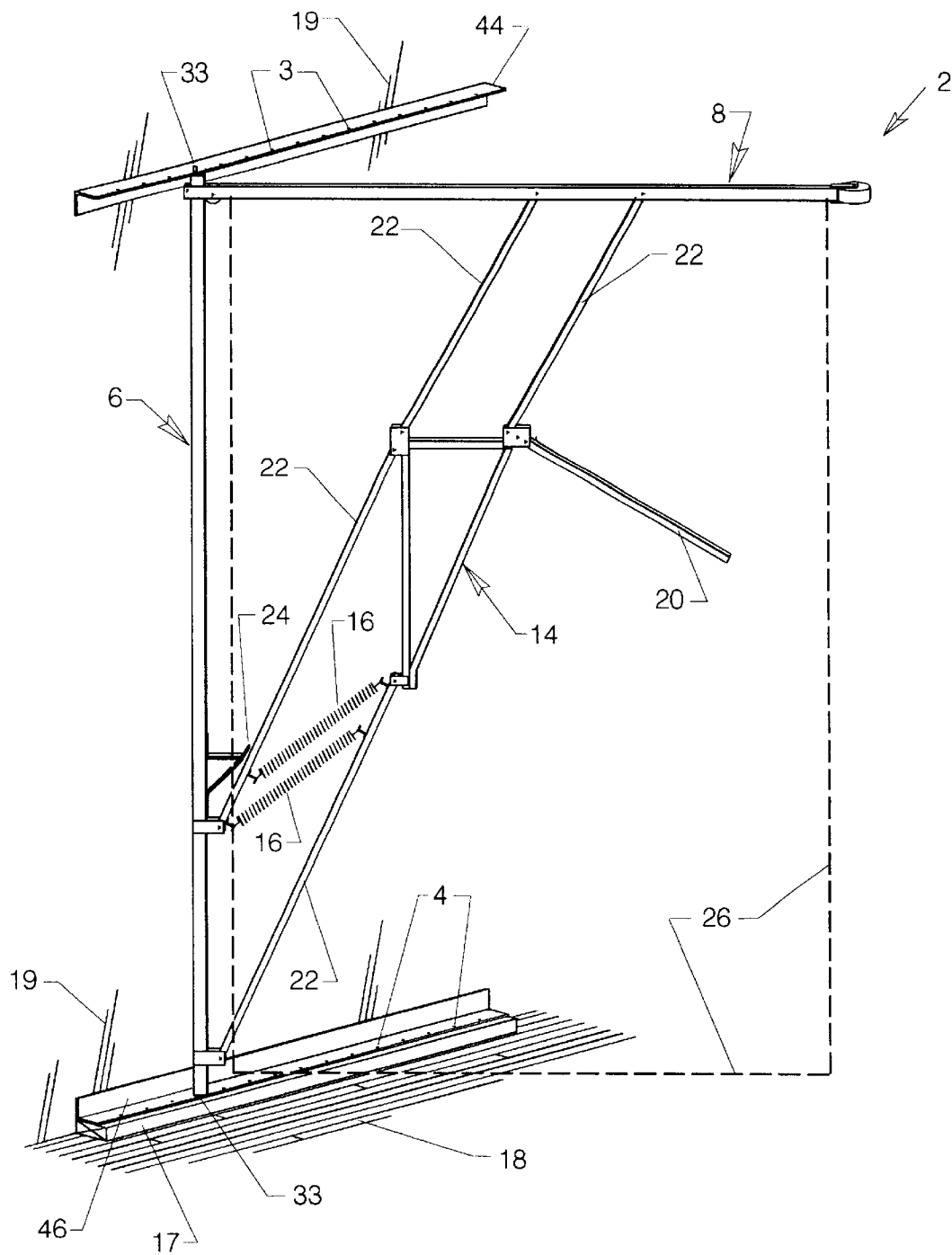
FIG. 1. Isometric drawing of a first preferred embodiment of the present invention configured for rug display.

Referring now in greater particularity to the drawings, the four primary elements of the arm and brace system constructed in accordance with the principles of the present invention, will be seen in different embodiments of the present invention shown in FIGS. 1–14. Those four primary elements common to all embodiments are: vertical guide assembly 6, arm assembly 8, parallel guide assembly 14, and pivoting parallel bars 22. Connected together, as detailed below, they work as a system to perform the function of raising and lowering the load bearing arm, such as arm assembly 8 in FIG. 1. Support elements of the present invention, not necessarily part of every embodiment, include: lift handle 20, tension springs 16, mechanical actuator 30, bicycle hooks 35, storage basket 47, etc. are described below to allow the arm assemblies 8 to be raised and lowered in an easy and controlled manner, and/or adapted to a particular function. Varying combinations of support elements may be contained in any one embodiment according to its intended application. The four primary elements common to all embodiments: vertical guide assembly 6, arm assembly 8, parallel guide assembly 14, and pivoting parallel bars 22, and their means of interconnection will be described in detail in FIGS. 6A and 6B, and thereafter only distinctive features of each embodiment will be discussed to avoid unnecessary repetition.

Referring now in detail to FIG. 1, a first preferred embodiment 2 of the present invention arm and brace system is illustrated and shows a hanger arm type of apparatus for rugs 26. Individual arm assemblies 8 are mounted within a raised hinge bar fixture 44, securely fastened to a wall or supporting framework 19, and to a lower companion pivot bar fixture 46, similarly fastened to horizontal support plate 17, and/or wall or supporting framework 19. The support plate 17 of wood, steel, and similar functional material serves as a mounting surface for a pivot bar 46 to allow for distribution of the combined weight of the resulting display of rugs 26 and their first and second embodiments 2 and 28 across the floor 18 surface, to compensate for any unevenness in the floor 18 surface, and to allow for proper plumbing and alignment of the hinge holes 3 and pivot holes 4 associated with the hinge bar 44 and pivot bar 46 members, respectively. The mounting of rug arm assemblies 8 in first preferred embodiment 2 is not limited in use to wall 19 mounting of hinge bar fixture 44 and floor 18 mounting of its companion pivot bar fixture 46, and although not shown in detailed illustration, all current trade art as to mounting hinge bar 44 and pivot bar 46 support fixtures are appropriate to the present invention including: wall mounting, mounting to vertical floor to ceiling post systems, as well as to a hinge bar 44 and pivot bar 46 combination incorporated into a free standing fixture. It is contemplated for the hinge bar 44 fixture and its companion pivot bar 46 fixture to be fabricated from steel angle, and other suitable material including, but not limited to flat, channel, and tubular shapes of any cross-sectional shape, dimension, or material so long as they provide hinge holes 3 and pivot holes 4, respectively aligned for vertical mounting of rug arm assemblies 8 by means of inserting hinge and pivot pins 33 welded, or otherwise attached, to the vertical support member 6 of the first preferred embodiment 2, thus allowing vertical guide assembly 6 to pivot freely about its horizontal axis, while being restrained vertically by hinge and pivot pins 33 (seen in detail in FIG. 6A) inserted in their respective mounting holes 3 and 4. Extending the hinge bar fixtures 44 and pivot bar fixtures 46 in a substantially parallel manner in space and vertical alignment of additional hinge holes 3 and pivot holes 4, allows for the installation of multiple arm and brace assemblies (each consisting of the four primary elements common to all embodiments: vertical support assembly 6, arm assembly 8, parallel guide assembly 14, and pivoting parallel bars 22, and their means of interconnection) that create a page style display of any desired capacity. Such page style displays can be mounted to a wall or support fixture 19 of any desired configuration. FIG. 1 also shows first preferred embodiment 2 having support elements that include lift handle 20, tension springs 16, and over center stop 24.

FIGS. 2–5 illustrate the operation of the arm and brace system of the present invention in its first and second preferred embodiments, respectively 2 and 28, between raised and lowered positions of highest and-lowest elevation. FIGS. 2 and 4, respectively, show first preferred embodiment 2 and second preferred embodiment 28 in a lowered position, while FIGS. 3 and 5 show first preferred embodiment 2 and second preferred embodiment 28, respectively, in elevated positions. FIGS. 2 and 3 show first preferred embodiment 2 with a spring-assisted manual lift using tension springs 16, while FIGS. 4 and 5 show second preferred embodiment 28 with an electrical or mechanical actuator 30. Although shown for use in handling and/or display of a rug 26, it is also contemplated for first preferred embodiment 2 and second preferred embodiment 28 to be used or modified for the storage, handling, and/or display of other articles, such as but not limited to draperies, towels, comforters, linens, sleeping bags, bicycles, etc.

Figure 6A:
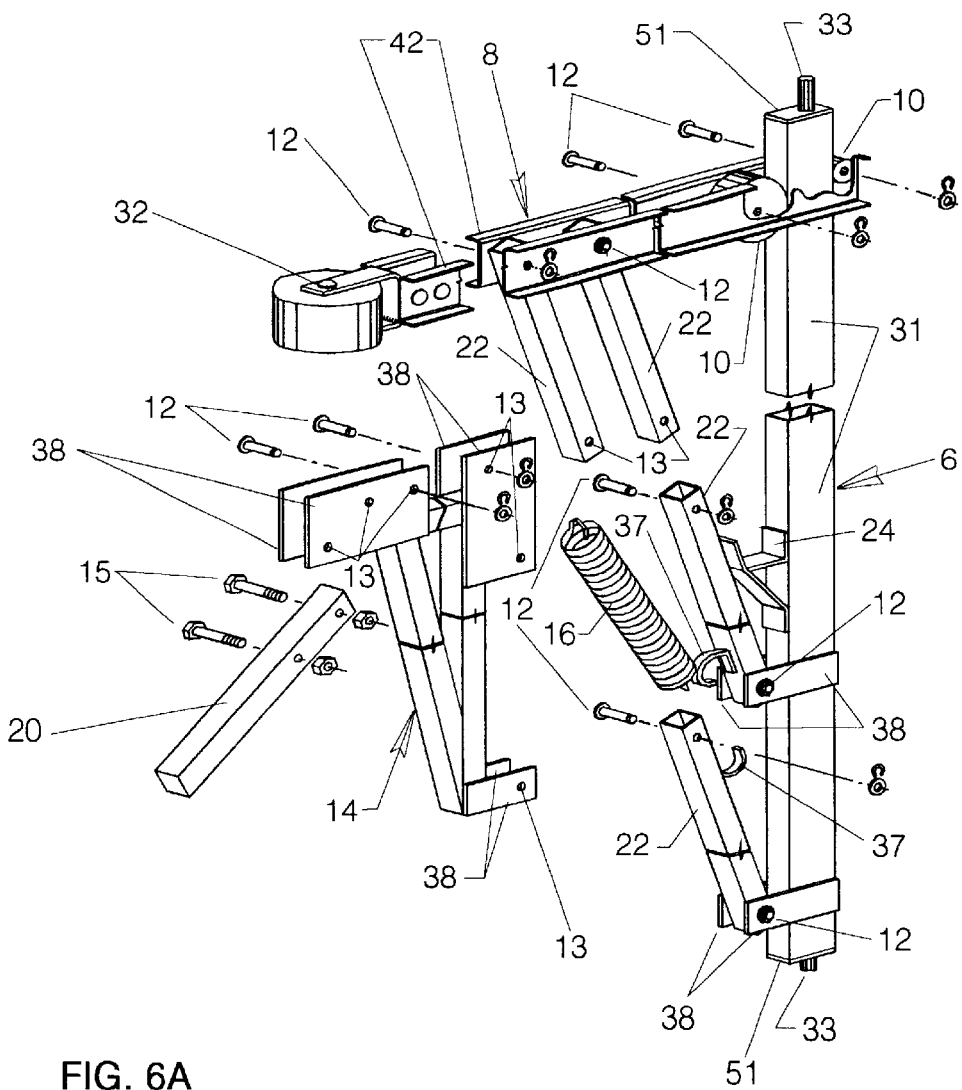
FIG. 6A. Enlarged isometric view of the channel arm configuration with associated components used in the first and second preferred embodiments of the present invention, and showing full arm and brace system assembly.
Figure 6B:
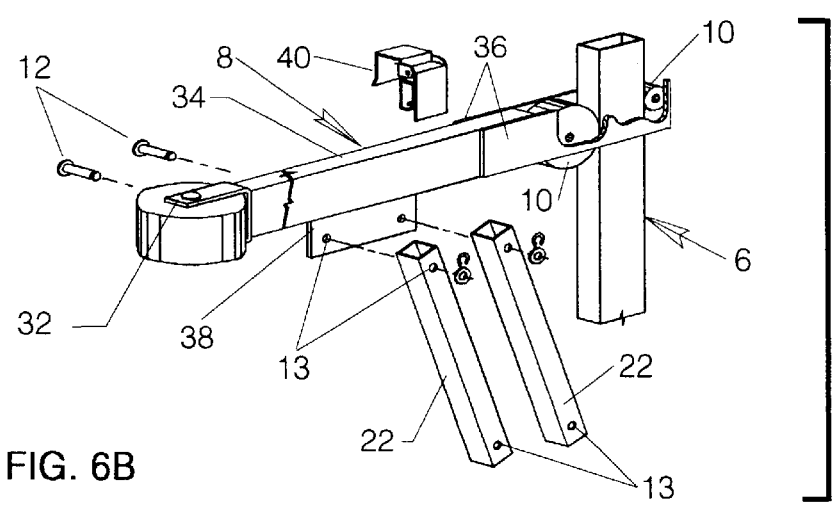
FIG. 6B. Enlarged isometric detail view of the present invention shown in tubular arm configuration with associated components used in the first and second preferred embodiments of the present invention.

In FIGS. 6A and 6B examples of alternating arm and brace assembly configurations for use with first preferred embodiment 2 and second preferred embodiment 28 are shown in detail. Although fabrication from steel components is preferred, the present invention is not limited to the use of steel materials, and the components of the present invention may also be fabricated from wood, aluminum, plastic, and by a combination of materials of any sectional shape and linear dimension, and not limited to flat, angle, channel, and tubular shapes of any cross-section or material so long as it provides for the structural and connective functions required for differing applications. FIG. 6A shows vertical support assembly 6 of, but not limited to, welded steel, or otherwise fastened materials, comprising: a vertical guide 31 of rolled steel tubing, round steel hinge and pivot pins 33, flat steel pin mounting plate 51, flat steel brace mounting bracket 38, and over center stop fabricated from flat steel 24. For ease of customer assembly, flat steel pin mounting plate 51 would be welded to the ends of the tubular vertical guide 31. Vertical guide assembly 6 is inserted through the rear end of arm assembly 8, between the offset rollers 10. Rollers 10 are offset vertically, with the front roller 10 (shown but not separately numbered) being a larger compression roller in a position located below that of its smaller companion tension roller 10 to prevent binding action when upward pressure is applied to the front of arm assembly 8. In the alternative, although offset rollers 10 are preferred, it is also contemplated for offset rollers 10 to be replaced by a separate bumper arrangement or other means of accomplishing the same function. In FIG. 6A, arm assembly 8 extends horizontally in an outward direction away from vertical guide assembly 6 with sufficient length to hang a rug 26 or other display object (not shown) of desired size. FIG. 6A further shows a roller separator 32 with bracket being attached to the distal end of arm assembly 8, which defines the minimum separation between adjacent arm assemblies 8 and allows them to swing laterally without binding and with minimum of effort. The channel arm members 42 in arm assemblies 8 are each preferably fabricated from steel channel, or similar material. Along the length of each channel arm member 42 used, two pivot holes 13 similar to the pivot holes 13 shown in FIG. 6B are located for the attachment of pivoting parallel bars 22, fabricated from, but not limited to, steel tubing, that serve as brace supports for arm assembly 8. As shown in FIG. 6A, at the proximal end of channel arm members 42 mounting holes 13 are located in appropriate positions along their channel length for mounting of offset rollers 10, utilizing grooved pin or similar pin connectors 12. The pivoting parallel bars 22 are each pinned at one end to the channel arm member 42, and although not shown in FIG. 6B, pivoting parallel bars 22 are pinned at their opposite ends to the horizontal brace mounting brackets 38 of the parallel guide assembly 14 utilizing similar pin fasteners 12. When set into its usable position and connected to pivoting parallel bars 22, FIG. 6A shows channel arm member 42 then becoming the hanger body for the number of rug clamps (not shown) needed to effectively support the weight of a rug 26, or other object needing display. FIG. 6B illustrates an alternative configuration for arm assembly 8 with a tubular arm member 34 preferably being fabricated from tubular steel, or similarly rectangular material, that is sized to accommodate commercially available alligator rug clips 40. Roller separator 32, pivoting parallel braces 22, and offset rollers 10 are attached to tubular arm member 34, via flat steel brace mounting bracket 38, and offset roller brackets 36, welded, or otherwise secured to the tubular arm member 34. Attachment of roller separator 32, pivoting parallel braces 22, and offset rollers 10 to mounting bracket 38 and offset roller brackets 36 is typically accomplished with grooved pins, with "E" ring fastener (not shown), or other similarly secure pin fasteners 12. Parallel guide assembly 14 in first preferred embodiment 2 and second preferred embodiment 28, as shown in FIG. 1 and FIG. 6A, is preferably a triangular welded, and otherwise securely fastened, steel framework fabricated from square or rectangular tubing, and other similarly functional material, consisting of vertical, horizontal, and diagonal members, with flat steel, etc., brace mounting brackets 38 welded, and otherwise securely fastened, in locations so as to maintain the horizontal and vertical hole locations required to maintain the parallel relationship of pivoting parallel bars 22. FIG. 6A also shows a lift handle 20 preferably consisting of an elongated tubular or solid bar. Even though shown again in the FIG. 1 as a straight square member in cross section, it is not contemplated for lift handle 20 to be limited to a straight bar. Round cross sections, as well as lift handles 20 having and curved and bent configurations will equally serve the same function. FIG. 10 illustrates a lift handle 20 with a bend at its distal end to form a gripping point. In addition, although not shown, lift handle 20 can serve as a fastening point for attachment of a sign or other informational message about the object being displayed in association therewith. Lift handle 20 is preferably attached to parallel guide assembly 14 via threaded or similar fasteners 15 through additional mounting holes, such as mounting holes 13 in FIG. 6A, provided in the upper front brace mounting bracket 38. The use of lift handle 20 allows one person to manually move the arm and brace system of the present invention up or down, and maintain control thereof, while standing in front of the associated arm assembly 8.

In FIG. 6A the arm and brace system of the present invention is completed by the lower pivoting parallel bars 22 also preferably fabricated from, but not limited to, steel tubing. FIG. 6A also shows lower pivoting parallel bars 22 being pinned at their front and rear ends by pin fasteners 12 to the brace mounting brackets 38 that are welded or otherwise attached to parallel guide assembly 14 and vertical guide assembly 6. FIG. 6A further illustrates a tension spring 16 attached via spring attachment brackets 37 welded, riveted, or otherwise attached to lower pivoting parallel bars 22. FIGS. 1–3 illustrate two tension springs 16 per arm assembly 8. In the alternative, although not shown, first preferred embodiment 2 and second preferred embodiment 28 could also comprise elastic straps or cords to fulfill the same function as provided by tension springs 16. The number and size of tension springs 16, elastic straps, or cords are not considered limiting to the present invention, and may be modified to the particular specifications of the load to be carried. Tension springs 16 are so attached and arranged that tension increases as arm assembly 8 is moved into a lowered position and is reduced as arm assembly 8 is raised. The tension applied to arm assembly 8 adds an elevating force that assists in raising and lowering arm assembly 8. Movement of arm assembly 8 upward and the interconnected pivoting parallel bars 22 and parallel guide assembly 14 rearward is limited by the over center stop 24 attached to vertical support assembly 6. FIGS. 4 and 5 illustrate the attachment of a mechanical actuator 30 via mechanical actuator attachment brackets 39 that are welded or otherwise secured to vertical guide assembly 6 and also to either of the interior or exterior pivoting parallel bars 22. Utilizing the screw drive principle, mechanical actuator 30 causes the associated arm assembly 8 to be raised or lowered by the extension or retraction of a threaded actuator ram (not shown). Location of mechanical actuator 30 is not limiting, in that its attachment bracket 39 can be located along vertical guide assembly 6 either below or above the parallel brace mounting bracket 38 at a location to allow the interior or exterior pivoting parallel bar 22 with mechanical actuator attachment bracket 39 to be moved by either compression or tension force respectively. In this manner larger or heavier loads can be raised and lowered with the aid of mechanical assistance.

Figure 7:
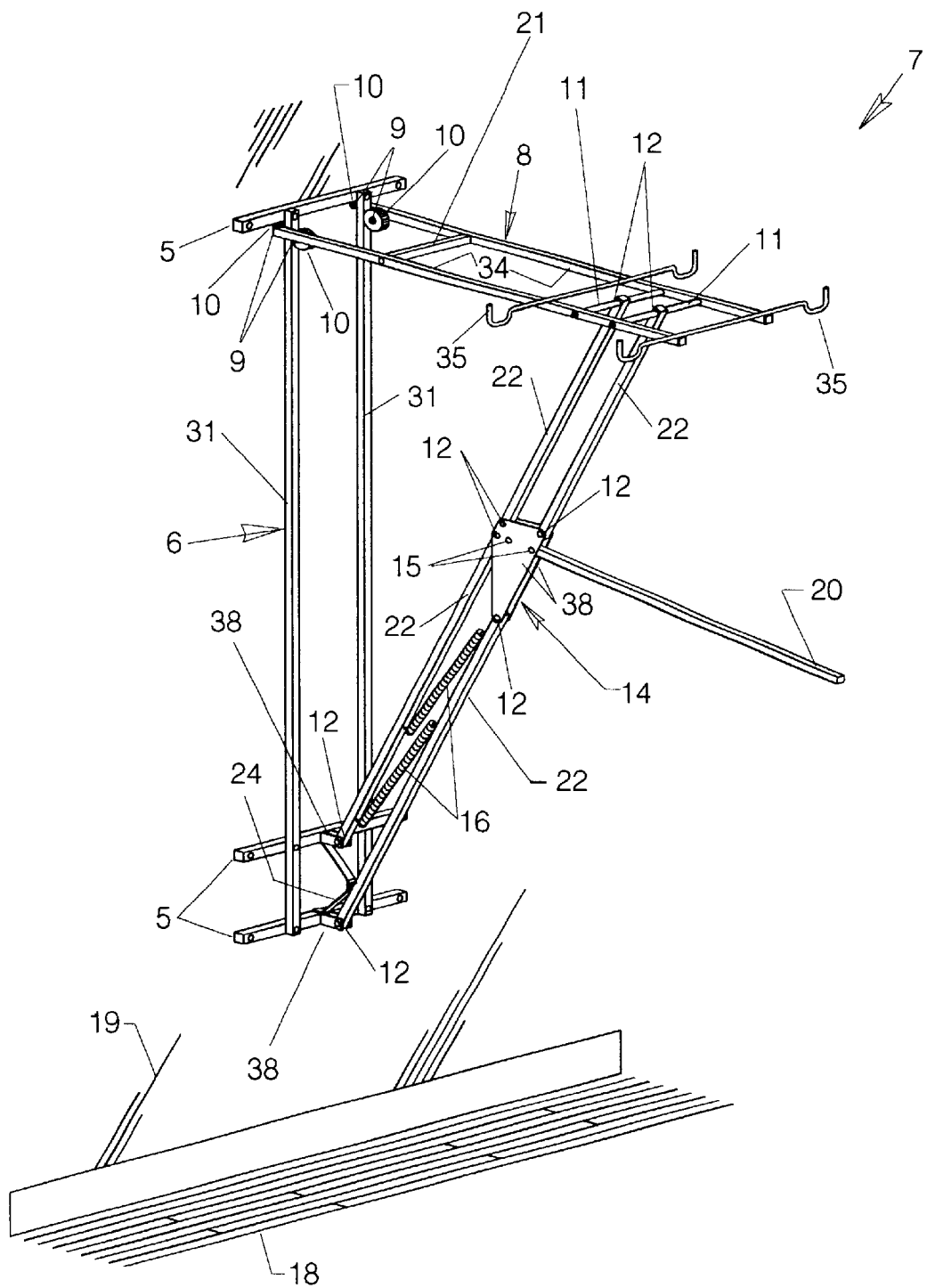
FIG. 7. Isometric drawing of a third preferred embodiment of the present invention configured for bicycle storage.
Figure 8:
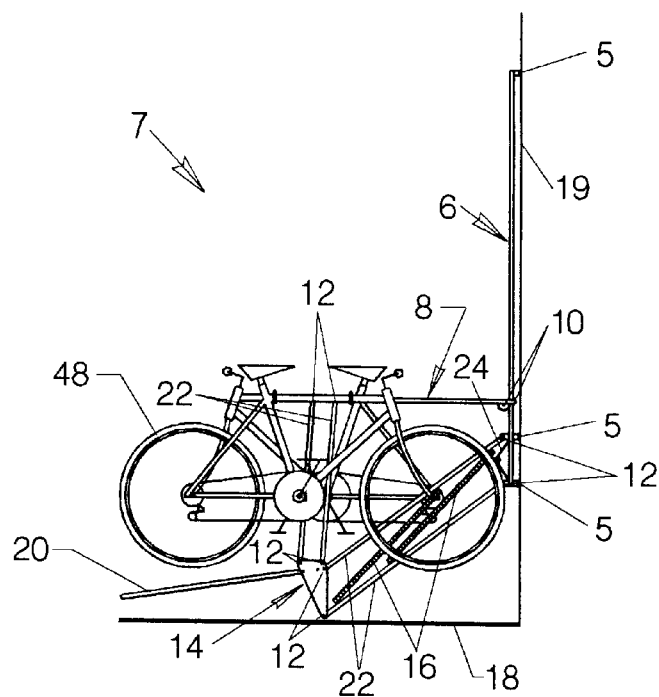
FIG. 8. Side view of the third preferred embodiment configured for bicycle storage, in lowered position.
Figure 9:
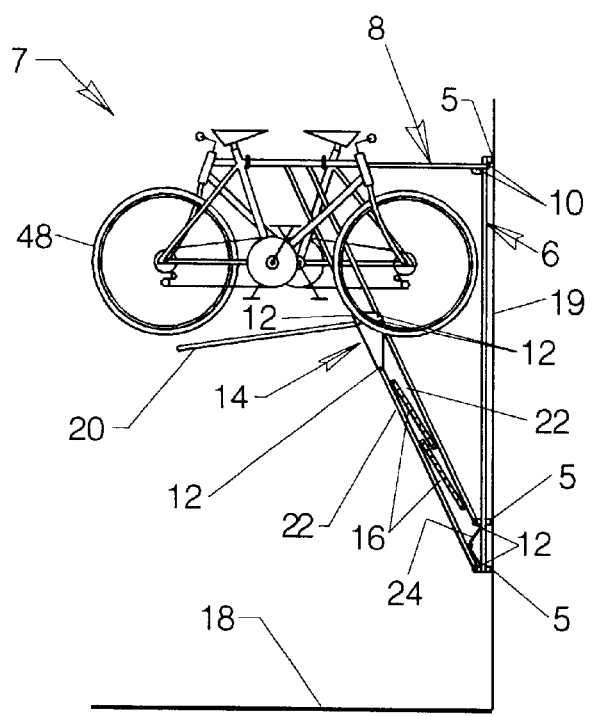
FIG. 9. Side view of the third preferred embodiment configured for bicycle storage, in elevated position.

FIGS. 7–9 illustrates a third preferred embodiment 7 of the arm and brace system of the present invention functioning as a bicycle storage rack. FIG. 7 shows the use of two vertical guide tubes 31 of steel tubing, or similar material, fixed wall mounting brackets 5 of steel tubing, or similar materials, over center stop 24 fabricated from flat steel, or similar materials, welded, or otherwise securely attached between the lower two fixed wall mounting brackets 5 and so located as to stop the rearward travel of the pivoting parallel bars 22 at a point "over center" along the brace system axis, so that the force of gravity from arm assembly 8, supplemented by tension action from the tension springs 16, will retain arm assembly 8 in its position of highest elevation. The twin tubular body of tubular arm member 34 has axel rods 9 with pin fasteners 12 welded, or otherwise attached, to provide mounting points for offset rollers 10. Hollow tubular steel spacers 11 are located on either side of pivoting parallel bars 22 through which an elongated pin fastener 12 passes. A tubular arm spacer 21 is welded, bolted, or similarly mounted between the tubular arm members 34 to maintain horizontal spacing. Bicycle hooks 35 are welded, bolted, or similarly mounted to the twin tubular arm members 34, to complete the arm assembly 8 of third preferred embodiment 7. The pivoting parallel bars 22, tension spring 16, spring attachment bracket 37, and pin fasteners 12 all function the same and have similar construction to the rug arm and brace system with spring-assisted lift in first preferred embodiment 2, shown in FIG. 1. Due to the smaller scale of the bicycle storage rack of third preferred embodiment 7, the parallel guide assembly 14 is fabricated from two brace mounting bracket plates 38 containing all brace and lift handle mounting holes 13. FIG. 8 shows the bicycle storage rack of third preferred embodiment 7 with a bicycle 48 in a lowered position. FIG. 9 shows the bicycle storage rack of third preferred embodiment 7 with a bicycle 48 in an elevated storage position.

Figure 10A:
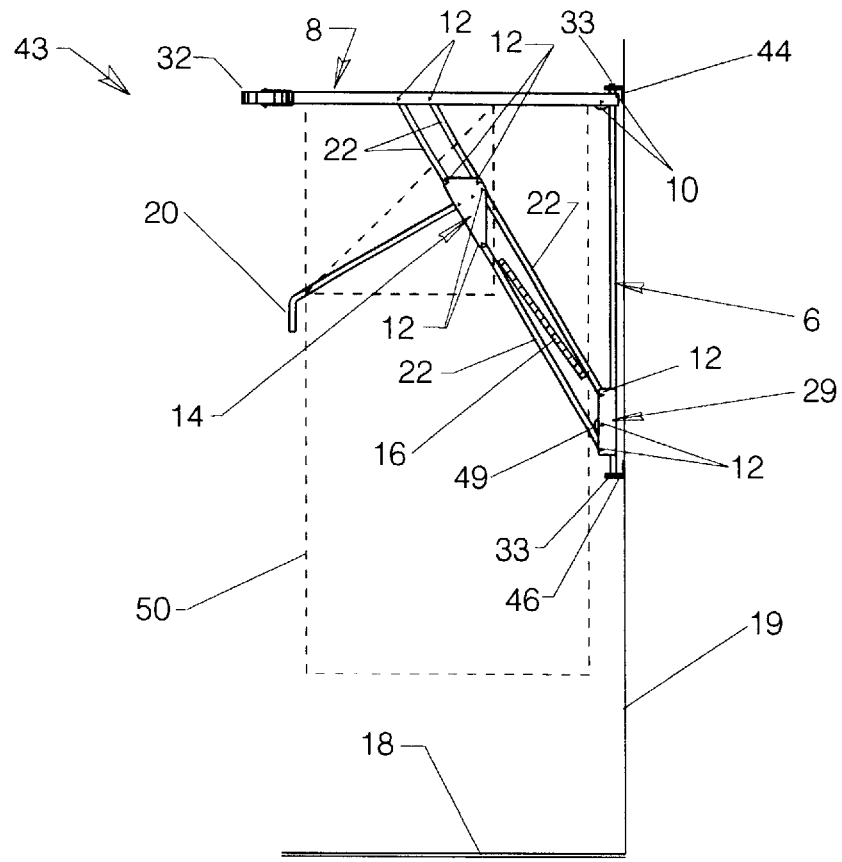
FIG. 10A. Side view of a fourth preferred embodiment of the present invention configured for the display of: sleeping bags, drapery fabrics, beach towels, and other similar sheet goods.
Figure 10B:
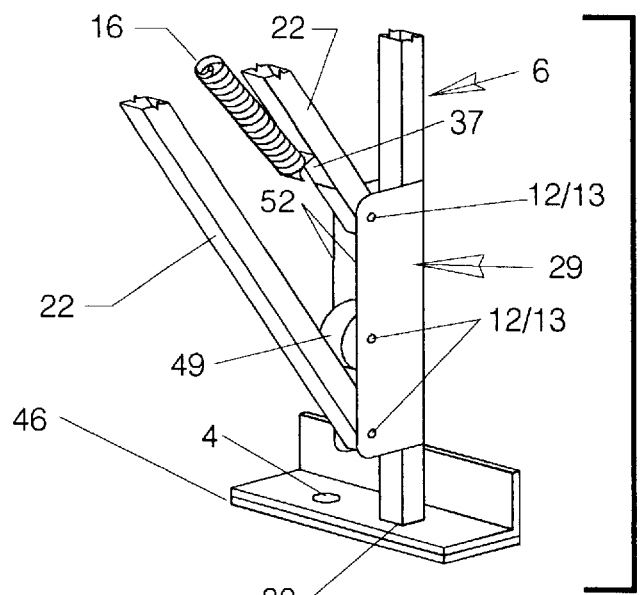
FIG. 10B. Enlarged isometric detail view of the fourth preferred embodiment of the present invention showing the mounting bracket stop assembly.

FIG. 10A and FIG. 10B illustrate a fourth preferred embodiment 43 of the arm and brace system of the present invention functioning as a hanger for a sleeping bag, drapery fabric sample, beach towel, and other sheet-like material 50. FIG. 10B shows in detail the lower portion of the vertical guide assembly 6 as detailed below. Unique to the fourth preferred embodiment 43 is its smaller scale and lighter materials, allowing the brace mounting plate 38 and over center stop 24, as shown in FIG. 6A, to be combined into one mounting bracket stop assembly 29, as shown in FIG. 10B. The mounting bracket stop assembly 29 utilizes a round flexible spacer wheel as a stop bumper 49, held in place by a pin connector 12, and located between the brackets 52 of the mounting bracket stop assembly 29. Also, due to its smaller size the parallel guide assembly 14 is fabricated from two brace mounting bracket plates 38 containing all brace and lift handle mounting holes 13. The lift handle 20 in this embodiment is tubular and features a bent handle grip on its distal end that extends beyond the sleeping bag 50 hung from arm assembly 8 to allow arm assembly 8 to be swung laterally by moving the bent handle grip. In all other aspects fourth preferred embodiment 43 is the same as the first and second preferred embodiments 2 and 8 described in FIGS. 6A and 6B which show channel and tubular styles of rug arm assemblies 8 raised and lowered via spring or elastic tension assisted mechanical lift.

FIGS. 11–14 illustrate a fifth preferred embodiment 45 of the arm and brace system of the present invention functioning as a storage basket. Unique to fifth preferred embodiment 45 is the use of an arm assembly 8 braced by paired sets of pivoting parallel bars 22, parallel guide assemblies 14, and vertical guide assemblies 6, to support an arm assembly 8 functional object therebetween, such as the storage basket 47 shown or other similar object such as a shelf, panel, fixture, cabinet, box, etc. FIGS. 11 and 12 show a perspective view of the operation of fifth preferred embodiment 45. FIGS. 13 and 14 show in detail the components of fifth preferred embodiment 45 in their lowered and raised positions. The tubular components of fifth preferred embodiment 45 are preferably fabricated from, but not limited in cross sectional shape to, round tubular aluminum, steel, or similar materials with flattened ends. The storage basket 47 serves the same function as the tubular arm assembly 8 shown in FIG. 6B. In fifth preferred embodiment 45 a single U-shaped tube forms the frame and bracket member 41 with its ends flattened to form the offset roller bracket (not separately numbered) all in one piece. A tubular arm spacer 21 is welded or riveted to the rear frame of storage basket 47, as well as arm assembly 8. A storage basket 47 of welded wire or web mesh or other material is attached to the arm assembly 8, which together with the offset rollers 10 mounted on axel rods 9 with pin or clip fasteners 12, complete the assembly of fifth preferred embodiment 45. The pivoting parallel bars 22 in fifth preferred embodiment 45 are also fabricated from round tubing and have flattened ends with pivot holes 13 for mounting. The lift handle 20 in fifth preferred embodiment 45 is preferably formed with a single U-shaped tube with offset bend and mounting holes 13 along its length and in its flattened ends to form the top members of the companion parallel guide assemblies 14 with brace brackets 38 in one piece. The diagonal and vertical members of parallel guide assemblies 14 in fifth preferred embodiment 45 are preferably formed from round tube with flattened ends and 13 pivot holes. The lift handle tube 20, parallel guide members 14, and pivoting parallel bars 22 in fifth preferred embodiment 45 are all preferably joined by pin connectors 12 in an overlapping manner. Also joined through the lower parallel guide assembly 14 and the pivot holes 13 in the brace mounting bracket 38 of upper vertical guide assembly 6 is the tension spring 16 or elastic strap/cord via a tie hook or mounting plate (not shown) attached to the ends of the 16 tension spring or elastic strap/cord. In all other aspects fifth preferred embodiment 45 is the same as that described in FIG. 6A and 6B for the channel and tubular styles of rug arm assembly 8 with spring or elastic tension assisted mechanical lift.

I claim:

1. An arm and brace system for use with large and awkward-to-display objects, said arm and brace system comprising:

a vertical guide and support member assembly having at least one vertically extending member and a plurality of mounting brackets attached to said at least one vertically extending member;

a horizontal arm assembly having at least one horizontally extending arm member, a plurality of additional mounting brackets attached to said at least one horizontally extending arm member, and connection means adapted for engaging said at least one vertically extending member without binding when upward pressure is applied to said at least one horizontally extending arm member;

a parallel guide assembly having a plurality of horizontally and vertically extending mounting holes;

two upper parallel braces each having a top end and an opposing bottom end, with said top ends being affixed to said horizontal arm assembly and said bottom ends being affixed to said horizontally extending mounting holes of said parallel guide assembly; and two lower parallel braces each having an upper end and an opposing lower end, with said upper ends being affixed to said vertically extending mounting holes of said parallel guide assembly and said lower ends being affixed to said mounting brackets of said vertical guide and support member assembly so that said at least one horizontally extending arm member can be mounted between a position of highest elevation and a position of lowest elevation, and movable therebetween in a controlled manner for the display, elevated storage, and facilitated handling of large and awkward-to-display objects.

2. The arm and brace system of claim 1 wherein said at least one vertically extending member has an inner surface facing the direction of object display and an opposing outer surface, and further wherein said connection means of said horizontal arm assembly comprises a pair of offset rollers bearing on said inner and outer surfaces, and also wherein one of said offset rollers is an outer tension roller and the other one of said offset rollers is an inner compression roller, said offset rollers being positioned relative to one another such that said outer tension roller is offset vertically higher from said inner compression roller to prevent binding when upward pressure is applied to said at least one horizontally extending arm member.

3. The arm and brace system of claim 1 further comprising a horizontal roller separator, two offset rollers, and a bracket attachment configured to contain said horizontal roller separator, and wherein said horizontal arm assembly further comprises two parallel channel arm members each having opposing ends and a plurality of holes, with the first pair of said opposing ends in said two parallel channel members being separated by said offset rollers spaced to contain said at least one vertically extending member, the second pair of said opposing ends in said two parallel channel arm members being separated by said bracket attachment, with said holes in said parallel channel arm members being sized and positioned for pinned connection of said upper parallel braces to said channel arm members so that objects needing elevated display or storage can be hung from said channel arm members via clamping means.

4. The arm and brace system of claim 1 wherein said horizontal arm assembly further comprises a single horizontally extending arm member of rectilinear cross section.

5. The arm and brace system of claim 4 further comprising a horizontal roller separator, two offset rollers, a first bracket attachment configured to contain said horizontal roller separator, a second bracket attachment configured to contain said offset rollers, and a plurality of parallel brace attachment brackets, wherein said single horizontally extending arm member has opposite ends, wherein said first bracket attachment is positioned to connect said offset roller guides at one of said opposite ends, wherein said second bracket attachment is positioned to connect said roller separator at the other of said opposite ends, and wherein said parallel brace attachment brackets are located along said single horizontally extending arm member between said opposite ends so that display objects can be hung from said horizontally extending arm member using traditional rug clips.

6. The arm and brace system of claim 1 wherein one of said two upper parallel braces is an interior upper parallel brace, and the other one of said upper parallel braces is an exterior upper parallel brace, wherein one of said two lower parallel braces is an interior lower parallel brace, and the other one of said lower parallel braces is an exterior lower parallel brace, and wherein said interior and exterior parallel braces each have an adjustment axis and a centerline axis that forms a straight line from its connection with said horizontal arm assembly to its connection with said vertical guide assembly, said system further comprising a spring-assisted manual lift mechanism having a lift handle attached to said parallel guide assembly, tension means attached between said exterior and interior lower parallel braces with said tension means being adapted for providing increasing tension as said system travels towards said position of lowest elevation, and a stop bracket attached to said vertical guide assembly with said stop bracket being configured and sized for stopping rearward travel of said parallel guide assembly and said lower parallel braces beyond said position of highest elevation when said alignment axis of said interior and exterior parallel braces has passed over said centerline axis, thereby using gravity to retain said arm and brace system in said position of highest elevation.

7. The arm and brace system of claim 1 further comprising a worm and threaded traveler mechanical actuator lift, wherein one of said lower parallel braces is an interior brace, and wherein said worm and threaded traveler mechanical actuator lift is attached between said vertical guide and support member assembly and said interior brace through use of said mounting brackets in said vertical guide and support member assembly.

8. The arm and brace system of claim 1 further comprising a plurality of pivot and hinge pins and a plurality of mounting plates, wherein said at least one vertically extending member has opposing ends, and wherein said pivot and hinge pins and said mounting plates are attached to said opposing ends of said at least one vertically extending member so as to allow several of said horizontally extending arm members to be installed together to create page style displays.

9. The arm and brace system of claim 1 further comprising a plurality of fixed mounting brackets, wherein said at least one vertically extending member has opposing ends, and wherein said fixed mounting brackets are attached to said opposing ends of said at least one vertically extending member for stationary application thereof.

10. The arm and brace system of claim 10 wherein said arm and brace system is utilized in pairs to support a secondary object.

11. The arm and brace system of claim 10 wherein said secondary object is selected from a group consisting of storage baskets, shelving, panels, bike racks, bicycle hooks, specialty fixtures, cabinets, and boxes.

12. A method for manufacturing an arm and brace system that can be mounted between a position of highest elevation and a position of lowest elevation, and movable therebetween in a controlled manner for the display, elevated storage, and handling of large and awkward-to-display objects, said method comprising the steps of:

providing at least one vertically extending member, at least one mounting bracket, at least one horizontally extending arm member, at least one additional mounting bracket, connection means, a parallel guide assembly having a plurality of horizontally and vertically extending mounting holes, two upper parallel braces, and two lower parallel braces;

attaching said at least one mounting bracket to said at least one vertically extending member to form a vertical guide and support member assembly;

attaching said at least one additional mounting bracket and said connection means to said at least one horizontally extending arm member to form a horizontal arm assembly wherein said vertical guide and support member assembly does not bind when upward pressure is applied to said at least one horizontally extending arm member;

attaching the top ends of said upper parallel braces to said horizontal arm assembly and attaching the bottom ends of said upper parallel braces to said horizontally extending mounting holes in said parallel guide assembly; and attaching the upper ends of said lower parallel braces to said vertically extending mounting holes in said parallel guide assembly and attaching the lower ends of said lower parallel braces to said mounting brackets of said vertical guide and support member assembly.

13. The method of claim 12 wherein said steps of attaching are interchangeable in order.

14. The method of claim 12 wherein said at least one vertically extending member has an inner surface facing the direction of object display and an opposing outer surface, and further wherein said connection means of said horizontal arm assembly comprises a pair of offset rollers, and the step of positioning said rollers to bear on said inner and outer surfaces.

15. The method of claim 12 wherein said horizontal arm assembly further comprises two parallel channel arm members each having a first end, a second end, and a plurality of holes, and further comprising the steps of providing a horizontal roller separator, two offset rollers, and a bracket attachment configured to contain said horizontal roller separator, separating said parallel channel arm members from one another at said first ends with said offset rollers spaced so as to contain said at least one vertically extending member between them, separating said second ends of said parallel channel arm members with said bracket attachment, and using said holes in said parallel channel arm members for pinned connection of said upper parallel braces to said channel arm members so that display objects can be hung from said channel arm members utilizing a clamping means.

16. The method of claim 12 wherein said horizontal arm assembly comprises a single horizontally extending arm member of rectilinear cross section, and further comprising the steps of providing a horizontal roller separator, two offset rollers, a first bracket attachment configured to contain said horizontal roller separator, a second bracket attachment configured to contain said offset rollers, and a plurality of parallel brace attachment brackets, positioning said first bracket attachment so as to connect said offset roller guides at one end of said horizontal arm assembly, positioning said second bracket attachment so as to connect said roller separator at the other end of said horizontal arm assembly, and positioning said parallel brace attachment brackets along said single horizontally extending arm member so that display objects can be hung from said horizontally extending arm member using traditional rug clips.

17. The method of claim 12 wherein said interior and exterior upper and lower parallel braces each have an adjustment axis and a centerline axis that forms a straight line from its connection with said horizontal arm assembly to its connection with said vertical guide and support member assembly, said method further comprising a step of providing tension means and a spring-assisted manual lift mechanism with a lift handle, a step of attaching said spring-assisted manual lift mechanism to said parallel guide assembly, a step of attaching said tension means between said exterior and interior lower parallel braces so that said tension means will increase in tension as said lift mechanism travels towards a position of lowest elevation, and a step of attaching said stop bracket to said vertical guide and support member assembly so as to stop rearward travel of said parallel guide assembly and said lower parallel braces beyond said position of highest elevation when said alignment axis of said interior and exterior parallel braces has passed over said centerline axis, thereby using gravity to retain said arm and brace system in a position of highest elevation.

18. The method of claim 12 further comprising a step of providing a worm and threaded traveler mechanical actuator lift, and a step of attaching said worm and threaded traveler mechanical actuator lift between said vertical guide and support member assembly and the interior one of said parallel braces through use of said mounting brackets in said vertical guide and support member assembly.

19. The method of claim 12 further comprising a step of providing a plurality of pivot and hinge pins and a plurality of mounting plates, wherein said at least one vertically extending member has opposing ends, and further comprising a step of attaching said pivot and hinge pins and said mounting plates are attached to said opposing ends of said at least one vertically extending member so as to allow several of said horizontally extending arm members to be installed together to create page style displays.

20. The method of claim 12 further comprising a step of providing a plurality of fixed mounting brackets, and a step of attaching said mounting brackets to opposing ends of said at least one vertically extending member for stationary application thereof.

21. The method of claim 12 wherein said arm and brace system is utilized in pairs to support a secondary object selected from a group consisting of storage baskets, shelving, panels, bike racks, bicycle hooks, specialty fixtures, cabinets, and boxes.

* * * * *

UNITED STATES PATENT AND TRADEMARK OFFICE
CERTIFICATE OF CORRECTION

| | |
|---|---|
| PATENT NO. | : 6,691,878 B1 |
| APPLICATION NO. | : 10/214972 |
| DATED | : February 17, 2004 |
| INVENTOR(S) | : Ernest G. Ovitz |

It is certified that error appears in the above-identified patent and that said Letters Patent is hereby corrected as shown below:

Cover Sheet: Applicant's last name is --OVITZ-- and not "OUITZ".

Column 2, line 33: after "display" and before "to" delete "."

Column 5, line 19: "highest and-lowest" should be --highest and lowest--

Column 11, line 19: "of claim 10" should be --of claim 1--

Signed and Sealed this

Third Day of October, 2006

JON W. DUDAS
*Director of the United States Patent and Trademark Office*